United States Patent [19]

Mattson

[11] Patent Number: 4,602,197

[45] Date of Patent: Jul. 22, 1986

[54] STEPPING MOTOR CONTROL SYSTEM

[75] Inventor: Gary L. Mattson, Thousand Oaks, Calif.

[73] Assignee: Xebec, San Jose, Calif.

[21] Appl. No.: 691,228

[22] Filed: Jan. 14, 1985

[51] Int. Cl.⁴ .............................................. H02P 8/00
[52] U.S. Cl. .................................... 318/696; 318/685
[58] Field of Search ................. 318/696, 685; 360/77, 360/78

[56] References Cited

U.S. PATENT DOCUMENTS

| | | | |
|---|---|---|---|
| 4,030,132 | 7/1977 | Iffikar | 360/78 |
| 4,326,635 | 5/1982 | Reilly | 318/696 |
| 4,383,209 | 5/1983 | Lewis | 318/696 |
| 4,426,608 | 1/1984 | Larson | 318/685 |
| 4,437,049 | 3/1984 | Tullos et al. | 318/696 |
| 4,438,380 | 3/1984 | Kaseta | 318/696 |
| 4,499,510 | 2/1985 | Harding et al. | 360/77 |

Primary Examiner—William M. Shoop, Jr.
Assistant Examiner—Saul M. Bergmann
Attorney, Agent, or Firm—Thomas E. Schatzel

[57] ABSTRACT

A system and method for controlling the operation of a dc stepping motor utilized for positioning a read/write head on a magnetic data storage disk operates to selectively establish different magnetic field strengths on the core members of the stepping motor, thereby minimizing the time period required to stop the motor at precise, preselected positions.

9 Claims, 4 Drawing Figures

*Fig_1*

*Fig_2*

Fig_3

Fig_4

STEPPING MOTOR CONTROL SYSTEM

BACKGROUND OF THE INVENTION

1. Field of the Invention

The present invention relates generally to systems for controlling stepping motors and, more particularly, to systems for controlling the operation of a dc stepping motor utilized for positioning a read/write head on a magnetic data storage disk.

2. Description of the Prior Art

In the field of electronic computer technology, it is typical to store data in binary form on the face of a rotatable disk, which face is coated wth a magnetizable substance. In operation, such disks are spun like phonograph records and the binary data is encoded upon, or retrieved from, the face of the disk by a movable magnetic transducer device called a read/write head. More particularly, the binary information is magnetically encoded on the face of the disk in concentric rings, called tracks, and the read/write head is selectively positionable in a direction radial of the disk to select a particular track at which the information is to be recorded or retrieved.

On such magnetic recording disks, it is known to have track densities ranging from about forty tracks per inch of the radius, for so-called floppy disks, to densities exceeding one thousand tracks per inch of the radius of the disk, for so-called hard disks. Accordingly, precise positioning of the read/write head is necessary so that the head can accurately access a particular desired track on the surface of the disk.

Not only is it important that the desired track on a magnetic recording disk be located accurately, but it is also important that the locating operation be conducted in as short a time as possible. The time period required to gain access to a particular desired track on a magnetic recording disk by positioning the read/write head over that track is usually referred to as the seek time. Minimization of seek time is desirable because, during the period that a particular track is being sought and data on that track is being located, the central processing unit of the computer is unable to proceed with the calculation, or other processing, for which the sought data is required input. For most magnetic disk memories, typical seek times range between ten and one hundred milliseconds.

In conventional magnetic recording disk systems, the read/write head is driven to seek a desired track on the disk by means of a dc (direct current) motor called a stepping motor. Such motors translate electrical pulses, which may be understood to be commands from the controller for the disk system, to rotational mechanical movement. In operation, the output shaft of the motor rotates through a specific angular rotation for each electrical command pulse. Such incremental rotational movement is converted to linear movement of the read/write head by a so-called capstan mechanism or the like. In typical systems, it is conventional to control the stepping motors in incremental steps of 1.8 degrees each or in incremental steps of 0.9 degrees each.

One requirement of operation of such stepping motors relates to the repeatability of the precision of the angular positioning of the output shaft of the motor at the incremental steps. For example, if a required angular stop is at 270°, it is highly desirable that such a stop be precisely repeatable and that the same stop position be reached regardless of whether the direction of rotation of the shaft of the motor preceding the stop was clockwise or counterclockwise.

A typical problem with stepping motors utilized to position a read/write head on a magnetic storage disk is that the output shafts of such motors may cease rotation by a fraction of a degree or more prior to reaching the desired angular position. This is called "stopping short". Because the stepping motor is required to rotate both in the clockwise and counterclockwise direction, to correspondingly extend or retract the read/write head across the face of the magnetic recording disk, the stopping-short phenomenon will cause inherent inaccuracies in positioning of the read/write head. That is, for a desired angular position, the actual position at which the motor stops will depend upon whether the motor approaches the desired stop position through clockwise or counterclockwise rotation. In practice, to compensate for the stopping-short problem, it is conventional to control a stepping motor so that its final approach to the desired stop position is always in the same direction, say in the counterclockwise direction. This is accomplished by requiring the motor to always rotate one stop beyond the desired stop and then returns to the desired stop. So, if the motor in the example is initially rotating clockwise, it will continue one stop beyond the desired 270° stop, and then made one incremental counterclockwise return step toward the 270° stop. Or, if the motor in the example is initially rotating counterclockwise, it will rotate one incremental stop or so beyond the desired 270° stop, then rotate clockwise until it goes one incremental stop beyond the 270° stop, and then reverse direction a third time to move counterclockwise toward the desired 270° stop.

The above-described procedure can be understood to compensate for the stopping-short problem by requiring certain mechanical movements prior to each stop. Thus, the procedure might be called "stepping too far and coming back." An inherent difficulty with this procedure is that the additional mechanical movements are time consuming and, therefore, contribute to relatively long seek times.

There may be both mechanical and electrical causes for the above-described stopping-short problem. For instance, friction in the mechanical elements of the read/write head positioning system may cause a stepping motor to stop short. Most often, however, magnetic hysteresis in the ferromagnetic cores of the stepping motor causes the stopping short problem, due to the fact that the strength of the magnetic field exerted by the core member depends upon whether the electric current passing through the windings surrounding the core is inncreasing or decreasing, and not just upon the amount of the current. In any case, the above-discussed compensation technique introduces time consuming mechanical movements.

SUMMARY OF THE PRESENT INVENTION

It is an object of the present invention, in its preferred embodiment, to provide an improved method and system for controlling the operation of a dc stepping motor utilized for positioning a read/write head on a magnetic data storage disk.

More particularly, it is an object of the present invention to provide a method and system which decreases the period of time required for a dc stepping motor to reach a precise position for stopping a read/write head on a magnetic recording disk.

In accordance with the preceding objects, the preferred embodiment of the present invention provides a method for controlling the operation of a dc stepping motor utilized for positioning a read/write head on a magnetic data storage disk comprising the steps of: establishing a first magnetic field associated with a particular winding on a first stationary core member of the stepping motor to draw the rotor of the stepping motor toward a first angular position when the rotor approaches the first position from one predetermined direction of the rotation; then, establishing a second magnetic field associated with the particular winding on the first stationary core member to draw the rotor toward a second angular position in the same predetermined direction of rotation, the second magnetic field having the same orientation but a reduced magnitude relative to the first magnetic field; subsequently, establishing a third magnetic fild associated with the particular winding on the first stationary core member to draw the rotor to a third angular position in the same predetermined direction of rotation, the third magnetic field having an opposite orientation to the first magnetic field and the same absolute magnitude; then, establishing a fourth magnetic field associated with the paritcular winding on the fourth stationary core member to draw the rotor to a fourth angular position in the same predetermined direction of rotation, the fourth magnetic field having the same orientation but a reduced magnitude relative to the third magnetic field.

The system of the present invention for controlling the operation of a dc stepping motor for positioning a read/write head on a magnetic data storage disk includes: a means for establishing a first magnetic field on a first stationary core member of the stepping motor to draw the rotor of the stepping motor to a first angular position when the rotor approaches the first position from one predetermined direction of the rotation; a means for establishing a second magnetic field on the first stationary core member to push the rotor to a second angular position in the same direction of rotation, the second magnetic field having the same orientation but a reduced magnitude relative to the first magnetic field; a means for subsequently establishing a third magnetic field on the first stationary core member to draw the rotor to a third angular position in the same direction of rotation, the third magnetic field having an opposite orientation to the first magnetic field and the same absolute magnitude; and a means for establishing a fourth magnetic field associated with the winding on the first stationary core member to draw the rotor to a fourth angular position in the same direction of rotation, the fourth magnetic field having the same orientation but a reduced magnitude relative to the third magnetic field.

An advantage of the present invention is the provision of an improved method and system for controlling the operation of a dc stepping motor utilized for positioning a read/write head on a magnetic data storage disk.

More particularly, an advantage of the present invention is the provision of a method and system which decreases the period of time required for a dc stepping motor to reach a precise position for stopping a read/write head on a magnetic recording disk.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
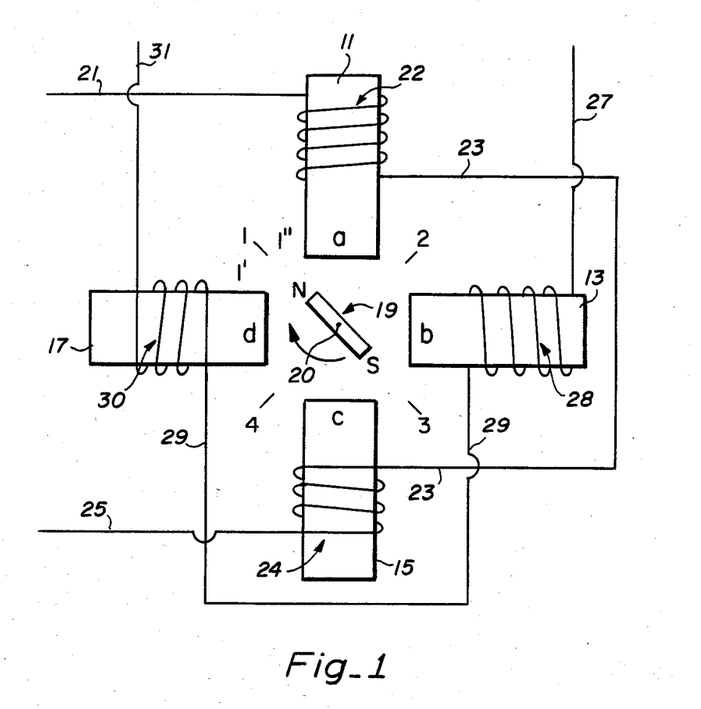
FIG. 1 is a simplified schematic diagram of a stepping motor.

Referring now to FIG. 1, there is shown a simplified schematic diagram of a stepping motor having four poles designated a, b, c, and d, respectively. It should be understood that FIG. 1 is offered for purposes of explanation, and is not intended to accurately depict the structure of an actual stepping motor, which may contain as many as one hundred poles. In practice, each of the poles comprises a core member made of a ferromagnetic material such as iron or an alloy thereof. The core members are arranged in pairs which are angularly spaced from one another. In the illustrated four-pole stepping motor, the core pairs are ac and bd, and the angular spacing between adjacent core members is ninety degrees, to form an X-like configuration. However, in the case of an actual stepping motor having one hundred pairs of pole members, for example, the angular spacing would be 1.8 degrees between adjacent core members.

Within the center of the array of opposed core members is a rotor member, generally designated by the numeral 19, which is mounted for rotation about an axis 20 which should be understood to extend normal to the plane of the drawing of FIG. 1. For purposes of simplifying the explanation of the present invention, the rotor member 19 has been depicted as a permanent bar magnet having north and south pole ends designated N and S, respectively. Workers skilled in this art will immediately recognize that the rotors of conventional stepping motors are substantially more complex. To implement the present invention, of course, such actual rotors will be utilized, not the simplified rotor of FIG. 1.

Wrapped about core member 11 is a helix of copper wire or the like, having a first extending end 21 and a second end 23. The extending wire 21 may be understood to be connected to constant voltage source as will be described later here in detail. The opposite end 23 of the wire forming the helix 22 extends to the core member 15, where the wire is wound about that core member in an orientation opposite the winding about the core member 11. For example, if the helix 22 is a left-hand wound helix, the helix 24 is wound right-hand. The wire 25 extending from the end of the helix 24 opposite the wire 23 is connected to a dc voltage source as will be described later herein in detail.

Similarly, a helix 28 is formed about the core member 13, and the helix has first and second extending end wires 27 and 29, respectively. The extending wire 27 should be understood to extend to be connected to a constant voltage source, or to ground, as will be described in detail later. The wire 29 at the opposite end of the helix 28 extends to the opposite core member 17 where it is wound about the core member in an orientation opposite the winding about the core member 17. For example, if helix 28 is left-hand wound, then helix 30 should be right-hand wound. The wire 31 extending from the end of the helix 30 opposite the wire 29 is connected to a constant voltage source or ground as will be later described in detail.

The effect of providing a dc electrical current from a constant voltage source through the helix 22 is to establish a magnetic field extending axially through the helix, which field will cause magnetization of the ferromagnetic core member 11. Accordingly, the end "a" of the core member adjacent the rotor 19 will have a particular magnetic orientation, such as that of a south pole, and the opposite end of the core member will have the opposite magnetic orientation.

The effect of current flow through the helix 24, which is wound opposite to the helix 22 on the core member 11, is to establish a magnetic field through the core member 15 opposite to the field through the core member 11. Accordingly, if the flow of current through the helix 22 is such as to establish end "a" of core member 11 as a south pole, then the same current passing through the helix 24 on the core member 15 will establish a magnetic field of the opposite orientation in core member 15 and, in this case, core end "c" will become a north pole.

With the preceding description in mind, the operation of simplified stepping motor of FIG. 1 can be understood, and the aforementioned stopping-short problem can be appreciated. Initially, it should be assumed that the rotor 19 is at position 1 illustrated in FIG. 1. To hold the rotor in this equilibrium position, core member ends "d" and "a" would both be south poles, so that the north end of the rotor 19 would be pulled equally toward those poles. Likewise, the ends "b" and "c" of the core members 13 and 15 would both be north poles, and the south pole of the rotor 19 would be pulled equally toward those poles. (At this juncture, it should be noted that in the above-described equilibrium positions, the magnetic orientation of core member 11 is opposite that of core member 15 and, likewise, the magnetic orientation of core member 13 is opposite that of core member 17; this is consistent with the earlier description of the helix 22 being wound opposite helix 24, and helix 28 being wound opposite helix 30.)

To move the rotor 19 so that its north end is oriented at position 2 in FIG. 1, the magnetic orientation of end "d" of core member 17 is changed from a south pole to a north pole; the new magnetic field at core end "d" repels the adjacent north pole end of the rotor 19 and tends to pivot the rotor 19 in the clockwise direction as indicated by the curved arrow in FIG. 1. Simultaneously with the reversal of the magnetic field at core end "d", the magnetic field at end "b" of core member 13 is reversed, and the core end "b" becomes a south magnetic pole which repels the adjacent end of the rotor 19.

Rotation of the rotor member 19 of FIG. 1 will continue until the rotor reaches equilibrium position 2, where the north magnetic end of the rotor is attracted equally by the ends "a" and "b" of the core members 11 and 13, respectively, both of which ends are south magnetic poles at this time. Likewise, in equilibrium position 2, the south magnetic end of the rotor is attracted equally by the ends "c" and "d" of the core members 15 and 17, respectively, both of which ends are north magnetic poles at this time.

The rotor 19 can be subsequently driven by the magnetic orientations of the core members 11, 13, 15, and 17 of FIG. 1 such that the rotor incrementally rotates, or "steps", clockwise from position 2 to position 3, to position 4, and back to position 1. The matrix in the following table summarizes the magnetic orientations of the core members at the equilibrium positions 1 through 4. In the table, it should be noted that the magnetic orientation of core end "a" is always opposite the magnetic orientation of core end "c" and, likewise, the magnetic orientation of core end "b" is always opposite the orientation of core end "d".

TABLE 1

| Magnetic Field Orientations of core member ends a-d at Equilibrium Positions 1-4. | | | | |
| --- | --- | --- | --- | --- |
| | 1 | 2 | 3 | 4 |
| a | S | S | N | N |
| b | N | S | S | N |
| c | N | N | S | S |
| d | S | N | N | S |

With Table 1 in mind in conjunction with FIG. 1, one can readily determine which pair of core members must reverse their magnetic field orientation to achieve an incremental stepping rotation from one equilibrium position to the next for a given direction of rotation (say clockwise). For example, to move from position 1 to position 2 in FIG. 1, it is clear from Table 1 that the magnetic orientations of core ends "b" and "d" must be reversed. This information is summarized in Table 2 below. Thus, for example, if it is desired that the rotor 19 incrementally steps from equilibrium position 2 to equilibrium position 3 in a clockwise direction, it is necessary to reverse the magnetic polarity on core end members "a" and "c" to obtain the energy to "push" the rotor to the new equilibrium orientation.

TABLE 2

| Magnetic Field Reversals For Incremental Step In Clockwise Direction to Positions 1-4. | | | | | | | | |
| --- | --- | --- | --- | --- | --- | --- | --- | --- |
| Position | 1 | to | 2 | to | 3 | to | 4 | to 1 |
| Operating Pair | | db | | ac | | bd | | ca |
| Operating Polarity | | NS | | NS | | NS | | NS |

In conjunction with FIG. 1, the stopping short problem can be understood to result in the situation where, upon clockwise rotation of the rotor 19 from position 4 to position 1, the rotor stops at position 1' which is a few degrees short of position 1. (Such stopping short, as mentioned previously, will cause mis-positioning of the read/write head which is driven by rotor 19 via a capstan mechanism or the like). According to the present invention, to correct for such mis-positioning, the strength of the magnetic fields established at the core members 11, 13, 15 and 17 are adjusted. More specifically, in the situation where rotor 19 stops short at position 1' rather than fully reaching position 1 upon clockwise rotation, the south magnetic field at core end "a" will be established so that it is stronger than the south magnetic field at adjacent core member "d". Accordingly, in this example, the north pole of rotor member 19 will be drawn more strongly toward core end "a" than toward core end "d". (Likewise, in this example, the south pole of rotor member 19 will be drawn more strongly toward core end "c" than core end "b").

Thus, with adjustment of the differential in magnetic field strength between adjacent core members, the stepping motor, upon clockwise rotation of the rotor 19, reaches position 1 rather than stopping short at position 1'.

Speaking more generally, the method and system of the present invention establishes a differential in magnetic field strength between adjacent pairs of the stationary core members such that the rotor of the stepping motor is drawn more strongly toward one of the adjacent core members than the other. In practice, the differential in field strength is about two to six percent. In Table 3 below, the compensated magnetic field strength are indicated by the subscript "w", indicating the weaker magnetic field. In position 1, for example, the south magnetic field at core member end "d" will be weaker than the south magnetic field on adjacent core member end "a".

TABLE 3

Compensated equilibrium magnetic fields of core members a-d at positions 1-4 for clockwise rotation.

|   | 1  | 2  | 3  | 4  |
|---|----|----|----|----|
| a | S  | Sw | N  | Nw |
| b | Nw | S  | Sw | N  |
| c | N  | Nw | S  | Sw |
| d | Sw | N  | Nw | S  |

To further assist in overcoming the stopping short problem, it may be appreciated that the "push" that the rotor member 19 is given in rotating from one angular position to another angular position should not be diminished. Thus, with Tables 2 and 3 in mind, and considering clockwise rotation from position 1 to 2, it should be appreciated that the magnetic fields at adjacent core member ends "d" and "b" should be at full strength to provide rotation of the rotor 19 from position 1 to position 2 even though the fields at those ends, prior to reversal of the field direction, were relatively weak. In otherwords, when the field direction on a core member is reversed to cause rotation of the rotor member in a manner which assists in compensating for the stopping short problem, it is desirable that the reversed field be at relatively full strength.

Table 4 below summarizes the aforedescribed procedures according to the present invention for compensating for the stopping short problem. For example, to move the rotor 19 from position 1 to position 2 in FIG. 1, the procedure is to reverse the polarity of core member ends "d" and "b", while permitting the magnetic fields through those core members to be at relatively full strength. Simultaneously, during the clockwise rotation to position 2, the magnetic field strength through core member ends "a" and "c" should be reduced. Accordingly, over a cycle, a given core member end goes cyclically through a state of being associated with a relatively full strength magnetic field, to a reduced strength field, to a field reversal at full strength, to a reduced strength field.

TABLE 4

Procedure for clockwise rotation, where the reversed fields are at full strength.

| Step   | Compensating Procedure              |
|--------|-------------------------------------|
| 1 to 2 | Reverse d and b, and reduce a and c.|
| 2 to 3 | Reverse a and c, and reduce d and b.|
| 3 to 4 | Reverse d and b, and reduce a and c.|

TABLE 4-continued

Procedure for clockwise rotation, where the reversed fields are at full strength.

| Step   | Compensating Procedure              |
|--------|-------------------------------------|
| 4 to 1 | Reverse a and c, and reduce d and b.|

Figure 2:
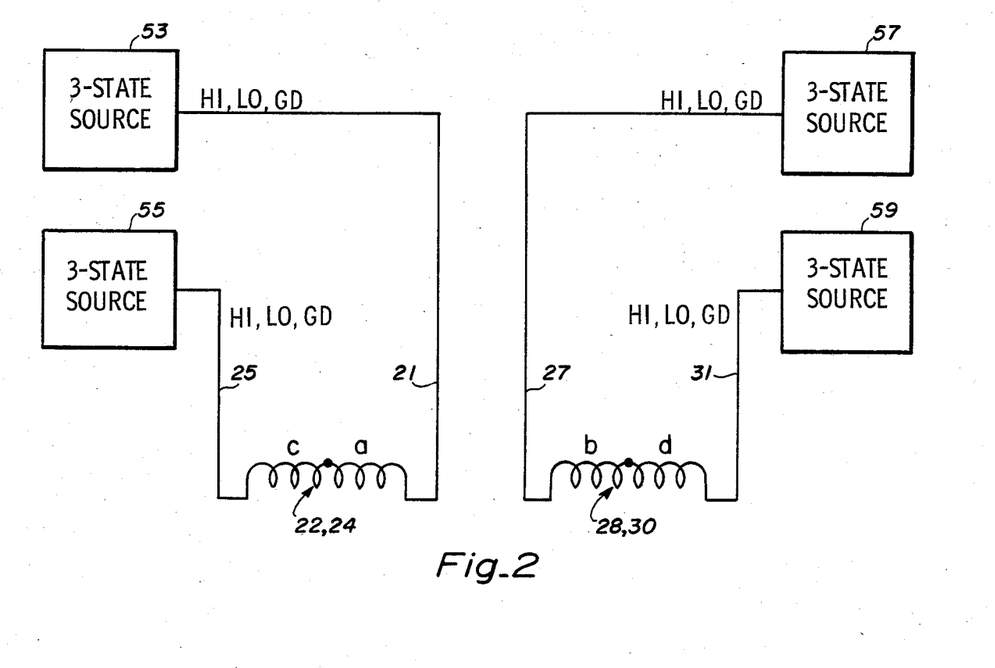
FIG. 2 is a schematic block diagram of a system for controlling a stepping motor such as the one of FIG. 1.

The block diagram of FIG. 2 indicates one system for implementing the aforedescribed procedures. In FIG. 2, the winding 22 and 24 of FIG. 1 are indicated as a single winding connected across wires 21 and 25, respectively. Likewise, windings 28 and 30 of FIG. 2 are shown as a single winding in FIG. 2, connected across wires 27 and 31, respectively. Block 53 indicates a controllable energization means, normally constant voltage source, which is connected to wire 21 and which has three selective states: high, low, and ground. Likewise, block 55 indicates a controllable constant voltage source connected to line 25; it too should be understood to selectively have high, low and ground states.

Similarly, blocks 57 and 59 indicate controllable constant voltage sources connected to wires 27 and 31, respectively, and having the aforementioned three states.

The "high" output of the controllable voltage sources 53, 55, 57 and 59 should be understood to represent the voltage necessary to impress the aforementioned relative maximum magnetic field strength on the windings 22 and 24 associated with the core members 11 and 15, respectively, of FIG. 1. The "low" output of the voltage source should be understood to represent the voltage necessary to impress the aforementioned relatively reduced magnetic field on winding 22 and 24. The "ground" condition of a three-state voltage source is the condition where inputs to it are connect to ground. These three states are indicated as "hi", "lo" and "gd", respectively, adjacent wires 21, 25, 27, and 31 in FIG. 2.

Figure 4:
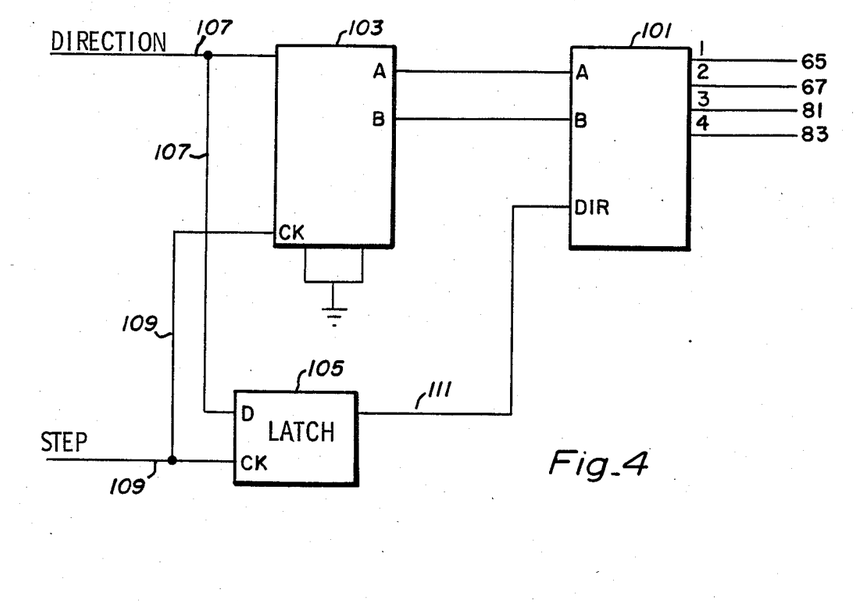
FIG. 4 is a schematic circuit diagram of another portion of a system for controlling the operation of a stepping according to the present invention.

Further, it should be understood that a means, as will be described in conjunction with FIG. 4, is provided to synchronize operation of the three-state voltage sources 53, 55, 57 and 59. The synchronization means, operates to control voltage source 53 in conjunction with voltage source 55 such that, if one of the voltage sources is in either the high or low condition, the other voltage source will be in the ground condition. Likewise, voltage sources 57 and 59 are controlled in conjunction with one another such that source 59 is always at ground if source 57 is in a high or low state, and vice versa. Further, the synchronization means controls the set of voltage sources 53 and 55 so any change of the output states of those voltage sources is accompanied by a change in output state of the voltage sources 57 and 59.

Table 5 summarizes the output conditions of the three-state voltage sources 53, 55, 57, and 59 necessary to accomplish the compensated magnetic field orientations set forth in Table 3.

Condition of sources 53, 55, 57 and 59 at equilibrium positions 1-4 for clockwise rotation.

| Position | Condition of Source          |
|----------|------------------------------|
| 1        | 53 hi, 55 gd; 57 lo, 59 gd   |
| 2        | 53 lo, 55 gd; 57 gd, 59 hi   |
| 3        | 53 gd, 55 hi; 57 gd, 59 lo   |

-continued

Condition of sources 53, 55, 57 and 59 at equilibrium positions 1-4 for clockwise rotation.

| Position | Condition of Source |
| --- | --- |
| 4 | 53 gd, 55 lo; 57 hi, 59 gd |

The conditions set forth in Table 5 can also be stated in terms of the "conditions" of the lines 21, 25, 27, and 31, where the term "condition" refers to the state of the voltage source to which the line leads. Thus, for example, the voltage source 53 is "high" in position 1 and, accordingly, line 21 will also be designated as "high" in that position. The conditions of the lines 21, 25, 27 and 31 are summarized in Table 6 below. The information in Table 6 will be useful in understanding the subsequent description of operation of the system of FIG. 3.

TABLE 6

Conditions of lines 21, 25, 27 and 31 at equilibrium positions 1-4 for clockwise rotation.

| Position | Condition of Line |
| --- | --- |
| 1 | 21 hi, 25 gd; 27 lo, 31 gd |
| 2 | 21 lo, 25 gd; 27 gd, 31 hi |
| 3 | 21 gd, 25 hi; 27 gd, 31 lo |
| 4 | 21 gd, 25 lo; 27 hi, 31 gd |

Figure 3:
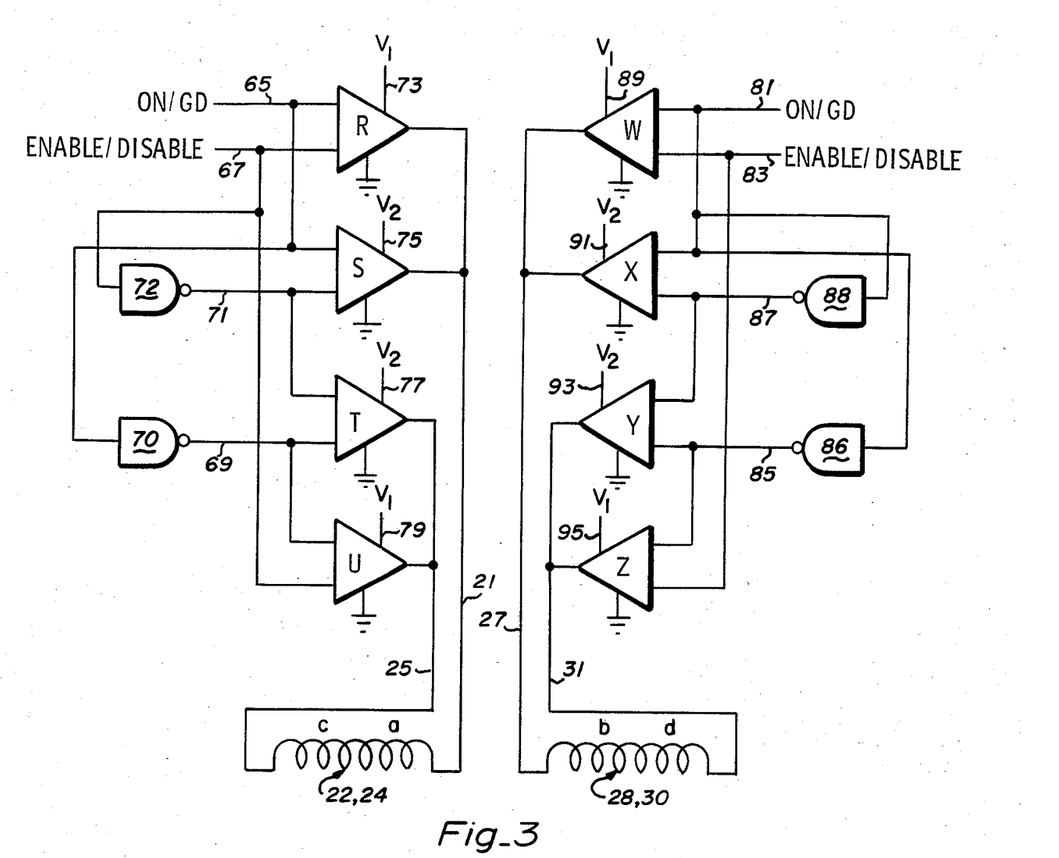
FIG. 3 is a schematic circuit diagram of a portion of a system for controlling a stepping motor according to the present invention.

In FIG. 3, the components of the three-state controllable voltage sources 53, 55, 57 and 59 are shown in detail. So, for example, the components within the three-state voltage source 53 comprises power amplifiers R and S, which are also referred to in the art as "drivers". Likewise, the three-state voltage source 55 includes drivers T and U, the source 57 includes drivers W and X, and the source 59 includes drivers Y and Z.

Referring now to driver R in FIG. 3, it is controlled by two binary signal input lines 6 and 67. The binary input line 65 is labelled "on/ground" and the other line 67 is labelled "enable/disable". Likewise, the drivers S, T and U are each controlled by two binary input lines. It should be noted that "on/ground" line 65 is common to drivers R and S, and "enable/disable" line 67 is common to drivers R and U. In addition, driver T is controlled by a second binary input line 69 which is common to driver U. Finally, driver S is controlled by a second binary input line 71 which is common to driver T. It should be observed that the binary signal on line 69 is the inverse of the signal on 65, the inversion being accomplished by conventional invertor 70 connected between lines 65 and 69. Likewise, the signal at line 67 is inverted by inverter 72 connected to line 71, the signal at line 81 is inverted by inverter 86 connected to line 85, and the signal at line 83 is inverted by inverter 88 connected to line 87. In this context, the term "inverted" means that the output of the inverter under consideration will be the binary complement of the input. Thus, for example, if the input to inverter 72 is a logical "1", the output will be a logical "0", likewise, if the input of the inverter 72 is a logical "0", the output will be a logical "1".

As also shown in FIG. 3, the driver R is connected via a line 73 to a relatively high voltage source V1. Driver S is connected by a line 75 to a relatively low voltage source V2. Similarly, driver T is connected to the relatively low voltage source V2 via line 77, and driver U is connected to the relatively high voltage source V1 via a line 79. In addition, all four of the drivers R, S, T and U are connected to ground. (In practice, the relatively high voltage source is at about +5 volts, and the relatively low voltage source is about 94 to 98% of the value of the high voltage source.)

The output lines from drivers R and S are both connected to line 21 leading to previously described coils 22, 24. Likewise, the output lines from driver T and U are both connected to line 25 leading to coils 22, 24.

Referring now to the right-hand half of the drawing of FIG. 3, it can be seen that essentially symmetrical circuitry is provided. For example, the components within the three-state voltage source 57 of FIG. 2 comprise drivers W and X of FIG. 3, and the components within the three-state voltage source 59 of FIG. 2 comprise drivers Y and Z of FIG. 3. Further, driver W is controlled by two binary signal input lines 81 and 83. The input line 81 is labelled "on/ground" and the other line is labelled "enable/disable". Likewise, the driver Z is controlled by binary input line 85 labelled "on/ground", and the driver Y is controlled by binary input line 87 labelled "enable/disable". In symmetry with the left-hand half of FIG. 3, the binary input line 81 is common to drivers W and X, input line 83 is common to drivers W and Z, input line 85 is common to drivers Y and Z, and input line 87 is common to drivers X and Y. Further in symmetry with the lefthand half of FIG. 3, the driver W is connected to the relatively high voltage source V1 via line 89, the driver X is connected to the relatively low voltage source V2 via line 91, the driver Y is connected to the relatively low voltage source V2 via line 93, and the driver Z is connected to the relatively low voltage source V1 via line 95. Also, all four drivers W, X, Y and Z are connected to ground.

As on the left-hand side of FIG. 3, the output line from drivers W and X are both connected to line 27 leading to the coils 28 and 30. Similarly, within dashed box 59, the output line from drivers Y and Z are both connected to line 31 leading to coils 28 and 30.

As will be described further in conjunction with FIG. 4, the various binary inputs to the drivers R-U and W-Z are synchronized with one another. Such synchronization, it might be noted, is facilitated by the fact that the enable/disable signal carried by line 67 is complementary to the signal carried by line 71 such that, if the signal on line 67 is "enable", then the signal on line 71 will be "disable", and visa versa. Likewise, the on/ground input on line 65 to drivers R and S is complementary to the on/ground input on line 69 to drivers T and U; thus, when the signal on line 65 is "on", the signal on line 69 will be ground, and visa versa. Similarly, with regard to the symmetrical circuitry on the right-hand side of FIG. 3, the input lines 81 and 85 are complementary in the sense that, if one of the lines carries an "on" signal, the other line will carry a "ground" signal. And, the input lines 83 and 87 are symmetrical in that, if one of the lines carries an "enable" signal, the other line will carry a "disable" signal.

The "disable" input signals in FIG. 3 should be understood to be such as to render a driver inoperative to act either as a voltage source or as ground. That is, in the presence of a "disable" signal, the associated driver can be considered to represent an infinite impedance, or open circuit. On the other hand, an "enable" signal should be understood to be such as to permit a driver to act either as a voltage source or ground depending upon the other binary input line to the driver. Thus, referring to driver R by way of example, if an "enable" signal is carried by line 67 and an "on" signal is carried by line 65, the output of the driver R will be the voltage V1 provided by line 73. In the same circumstances, but where a "ground" signal is carried by line 65, the output line of the driver R will simply be connected to ground. Similarly, referring to driver S in the situation where the driver receives an "enable" signal via line 71 and an "on" signal via line 65, the output of the driver will be the relatively low voltage V2.

With the preceding description in mind, the operation of the circuitry of FIG. 3 can be readily understood. As a starting point, it should be noted that the condition of line 21 can be at ground, or at voltage V1 or V2 depending upon the states of drivers R and S. It should also be understood that voltage V1 is the aforementioned "hi" voltage appearing in Table 6, and voltage V2 is the "lo" voltage appearing in that table. Similarly, the condition of line 25 depends upon the state of the driver pair T and U, the condition of line 27 depends upon the state of drivers W and X, and the condition of line 31 depends upon the state of drivers Y and Z.

The conditions of lines 21 and 25 can, therefore, be expressed in terms of the states of drivers R-U, as set forth in Table 7 below. In that table, it should be noted that the binary input lines 65 and 69 (i.e., the on/ground inputs) are always complementary to one another and, likewise, the input lines 67 and 71 (enable/disable) are always complementary relative to each other. Further in Table 7, it should be noted that only the binary input "enable/disable" changes state from position 1 to position 2, and from position 3 to position 4 (where "position" refers to the location of the rotor 19 shown in FIG. 1). Likewise, only the binary input "on/ground" changes state from position 2 to position 3, or from position 4 to position 1.

TABLE 7

Status of binary inputs to drivers R-U at rotor positions 1-4 for clockwise rotation.

| Position | R | S | T | U |
|---|---|---|---|---|
| 1 (21 hi, 25 gd) | on, en. | on, dis. | gd, dis. | gd, en. |
| 2 (21 lo, 25 gd) | on, dis. | on, en. | gd, en. | gd, dis. |
| 3 (21 gd, 25 hi) | gd, en. | gd, dis. | on, dis. | on, en. |
| 4 (21 gd, 25 lo) | gd, dis. | gd, en. | on, en. | on, dis. |

In an analogous manner, a table can be constructed showing the status of the binary inputs to the drivers W-Z of FIG. 3 at the rotor positions 1-4 of FIG. 1.

Although the drivers R-U have been illustrated as separate components in FIG. 3, it should be understood that the same may be integrated into a single electronic device. One such device is the linear integrated circuit known as a push-pull four channel driver. Likewise, a single integrated circuit can be utilized to comprise drivers W-Z. Such devices, which are commercially available from various sources, typically, are integrated high voltage, high current multi-channel drivers designed to accept standard DTL or TTL logic levels to drive inductive loads such as relay solenoids, d.c. and stepping motors.

Further as to the operation of the circuitry of FIG. 3, it should be understood that the signals carried on the binary input lines are either logical 0 or 1 signals. Therefore, information in Table 7 can readily be translated into binary notation if the "on" and enable signals are defined as logical 1's, and the ground and disable signls are defined as logical zeros. The thusly translated information in presented below in Table 8.

TABLE 8

Status of input lines 65, 67, 69 and 71 at rotor positions 1-4 for clockwise rotation.

| | Position/Input Lines | | | |
|---|---|---|---|---|
| | 65 | 67 | 69 | 71 |
| 1 | 1 | 1 | 0 | 0 |
| 2 | 1 | 0 | 0 | 1 |
| 3 | 0 | 1 | 1 | 0 |
| 4 | 0 | 0 | 1 | 1 |

One again, it should be observed that the binary inputs on lines 65 and 69 are complements. That is, whenever a logical "1" appears on line 65, a logical "0" will appear on line 69, and visa versa. Likewise, the inputs on lines 67 and 71 are binary complements.

Thus, to control operation of the drivers R-U in one direction of rotation of the stepping motor, only two distinct binary inputs "on/ground" and "enable/disable" are actually needed, but it is necessary that the binary inputs change state in a predetermined order. Likewise, to control drivers W-Z in the same direction of rotation, only two distinct binary inputs are necessary, which again must be contolled to change state in a predetermined order. Thus, for a given direction of rotation, a total of four mutually independent binary input signals are required to control operation of the eight drivers of FIG. 3. To control operation of the drivers in the opposite direction of rotation, the same four mutually independent binary inputs are needed, but the order in which the inputs change state is altered.

FIG. 4 shows one system for synchronizing operation of the drivers in FIG. 3, including determination of direction of rotation of the rotor 19 as well as the stopping location. In the system of FIG. 4, a memory component 101 has four output lines corresponding the binary logic input lines in FIG. 3, and similarly numbered. Thus, for example, output line 67 from the memory component 101 is the same as "enable/disable" input line 67 to driver R of FIG. 3. Memory component 101 may be understood to comprise, for example, a programmable read only memory unit (PROM). As such, the unit includes the clockwise rotation program of Table 8, and a similar program for counterclockwise rotation. The program executed by the PROM depends upon the direction input 103. Further, the PROM is able to stop execution of the program at a given position, say position 3. The information required by the PROM 101 to execute in the pre-programmed manner includes an activation or "step" command, and a directional command. The latter command will direct the PROM 101 to execute the program for clockwise rotation, or counterclockwise rotation.

In FIG. 4, components provided to operate in the PROM 101 are counter 103 and a latch 105, both of which are conventional components. A directional binary signal is carried to those components by line 107. (The clockwise directional command may be a logical "1", for example, and the counterclockwise command a logical "0".) The command to "step" is carried to the counter 103 and the latch 105, respectively, by lines 109 and is connected to the "clock" inputs at both of those components.

The output of the latch components 105 is carried to the PROM 101 by line 111. The outputs from the counter 103 are carried to the PROM 101 by lines 113a and 113b.

In operation, the signal on output line 111 from the latch 105 will indicate the desired direction on rotation. This signal will persist so long as the component receives a "step" signal to its clock input. (In other words, the output of component 105 will be "latched" to equal the initial directional input until such time as the clock input changes its binary state.) The counter 103 serves to determine the number of steps to be taken according to the clock input. Thus, for example, the PROM may be instructed to cause rotation of the stepping motor for two steps in the clockwise direction, or three steps in the counterclockwise direction. The desired number of steps, as well as the direction of rotation, is determined by controller for the disk drive subsystem in a well-known manner. It should be emphasized, however, that the present invention permits the system to reach a desired stopping position for the stepping motor in a highly efficient manner and, particularly, without the previously-described procedure of stepping too far and coming back.

Although the present invention has been described with particular reference to the illustrated preferred embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all alterations, modifications and embodiments as fall within the true spirit and scope of the present invention.

I claim:

1. A method for controlling the operation of a dc stepping motor utilized for positioning a read/write head on a magnetic data storage disk comprising the steps of:
   (a) establishing a first magnetic field associated with a winding on a first stationary core member of the stepping motor to draw the rotor of the stepping motor toward a first angular position when the rotor approaches the first position from one predetermined direction of the rotation;
   (b) establishing a second magnetic field associated with the winding on the first stationary core member to draw the rotor toward a second angular position adjacent said first angular position but following the same in the direction of rotation, the second magnetic field having the same orientation but a reduced magnitude relative to the first magnetic field; subsequently,
   (c) establishing a third magnetic field associated with the winding on the first stationary core member to push the rotor to a third angular position in the same direction of rotation, the third magnetic field having an opposite orientation to the first magnetic field and the same absolute magnitude; then,
   (d) establishing a fourth magnetic field associated with the winding on the first stationary core member to draw the rotor to a fourth angular position in the same direction of rotation, the fourth magnetic field having the same orientation but a reduced magnitude relative to the third magnetic field.

2. A method according to claim 1 further including the steps of:
   simultaneously with the establishment of the magnetic field on the first core member, at the winding associated with the stationary core member diametrically opposite the first core member, establishing a magnetic field oriented opposite the magnetic field at the first core member and of equal absolute magnitude.

3. A method according to claim 1 including the further steps of:
   (a) in a winding associated with a stationary core member precedingly adjacent the first core member in the direction of rotation of the rotor, when said first magnetic field is established on the first core member, establishing a fifth magnetic field on said precedingly adjacent core member, said fifth magnetic field having the same orientation but a reduced magnitude relative to the first magnetic field; then,
   (b) after said second magnetic field is established on the first core member, establishing a sixth magnetic field on said precedingly adjacent core member, said sixth magnetic field having an opposite orientation to the first magentic field and the same absolute magnitude; then,
   (c) after said third magnetic field is established on the first core member, establishing a seventh magnetic field on said precedingly adjacent core member, said seventh magnetic field having the same orientation but a reduced magnitude relative to said sixth magnetic field; then,
   (d) after said fourth magnetic field is established on the first core member, establishing an eighth magnetic field on said precedingly adjacent core member, said eighth magnetic field having an orientation the same as said fifth magnetic field and an increased magnitude.

4. A system for controlling the operation of a dc stepping motor for positioning a read/write head on a magnetic data storage disk comprising:
   (a) means for establishing a first magnetic field on a first stationary core member of the stepping motor to draw the rotor of the stepping motor to a first angular position when the rotor approaches the first position from one predetermined direction of the rotation;
   (b) means for establishing a second magnetic field on the first stationary core member to push the rotor to a second angular position in the same direction of rotation, the second magnetic field having the same orientation but a reduced magnitude relative to the first magnetic field;
   (c) means for subsequently establishing a third magnetic field on the first stationary core member to draw the rotor to a third angular position in the same direction of rotation, the third magnetic field having an opposite orientation to the first magnetic field and the same absolute magnitude; and
   (d) means for establishing a fourth magnetic field associated with the winding on the first stationary core member to draw the rotor to a fourth angular position in the same direction of rotation, the fourth magnetic field having the same orientation but a reduced magnitude relative to the third magnetic field.

5. A system for controlling the operation of a DC stepping motor utilized for positioning a read/write head on a magnetic data storage disk comprising:
   (a) a first controllable energization means connected to the winding on a first stationary core member of the stepping motor, such that said winding exerts an electromagnetic force on the rotor of the stepping motor;
(b) snchronizing means connected to control the energization means such that the winding is selectively energized with a first relatively high voltage, or a relatively lesser voltage, or is connected to ground depending upon the desired position of the rotor of the stepping motor.

6. A system for controlling the operation of a stepping motor according to claim 5 further including:
a second controllable energization means connected to said winding on said first stationary core member and connected to the synchronizing means such that said second controllable energization means is at ground potential whenever the first controllable energization means is at either said relatively high voltage or said relatively lesser voltage, and such that said first controllable energization means is at ground potential whenever the second controllable energization means is at either said relatively high voltage or said relatively lesser voltage.

7. A system for controlling the operation of a stepping motor according to claim 6 wherein said first and second controllable energization means each comprises a pair of voltage driver means.

8. A system for controlling the operation of a stepping motor according to claim 7 wherein one of the voltage driver means of each said pair is connectd to provide said relatively high voltage output and the other is connected to provide said relatively lesser voltage output.

9. A system for controlling the operation of a stepping motor according to claim 8 including means to selectively disable each voltage driver of said pairs of voltage drivers, whereupon the output of the disabled driver acts as an open circuit.

* * * * *